(12) United States Patent
Combes et al.

(10) Patent No.: US 9,346,038 B2
(45) Date of Patent: May 24, 2016

(54) FISCHER-TROPSCH CATALYST COMPRISING COBALT, MAGNESIUM AND PRECIOUS METAL

(71) Applicant: JOHNSON MATTHEY PUBLIC LIMITED COMPANY, London (GB)

(72) Inventors: Gary Bevan Combes, Cleveland (GB); John Bleddyn Claridge, Liverpool (GB); James Robin Gallagher, Liverpool (GB); Matthew J Rosseinsky, Liverpool (GB); Paul Boldrin, Liverpool (GB)

(73) Assignee: JOHNSON MATTHEY PUBLIC LIMITED COMPANY, London (GB)

( * ) Notice: Subject to any disclaimer, the term of this patent is extended or adjusted under 35 U.S.C. 154(b) by 27 days.

(21) Appl. No.: 14/347,383

(22) PCT Filed: Oct. 3, 2012

(86) PCT No.: PCT/GB2012/052447
§ 371 (c)(1),
(2) Date: Mar. 26, 2014

(87) PCT Pub. No.: WO2013/054091
PCT Pub. Date: Apr. 18, 2013

(65) Prior Publication Data
US 2014/0243436 A1    Aug. 28, 2014

(30) Foreign Application Priority Data
Oct. 14, 2011    (GB) .................................. 1117738.3

(51) Int. Cl.
| | | |
|---|---|---|
| *B01J 23/00* | (2006.01) | |
| *B01J 23/89* | (2006.01) | |
| *B01J 37/02* | (2006.01) | |
| *B01J 37/08* | (2006.01) | |
| *B01J 37/18* | (2006.01) | |
| *B01J 21/04* | (2006.01) | |
| *B01J 21/14* | (2006.01) | |
| *B01J 33/00* | (2006.01) | |
| *B01J 35/00* | (2006.01) | |
| *B01J 37/00* | (2006.01) | |
| *C10G 2/00* | (2006.01) | |

(52) U.S. Cl.
CPC .............. *B01J 23/8946* (2013.01); *B01J 21/04* (2013.01); *B01J 21/14* (2013.01); *B01J 23/8913* (2013.01); *B01J 33/00* (2013.01); *B01J 35/006* (2013.01); *B01J 37/0009* (2013.01); *B01J 37/0205* (2013.01); *B01J 37/0207* (2013.01); *B01J 37/0242* (2013.01); *B01J 37/0244* (2013.01); *B01J 37/08* (2013.01); *B01J 37/18* (2013.01); *C10G 2/332* (2013.01); *C10G 2/333* (2013.01)

(58) Field of Classification Search
CPC ........ B01J 23/83; B01J 37/207; B01J 23/462; B01J 21/04; B01J 33/00; B01J 37/0205; B01J 23/75
USPC ........................................................ 502/302
See application file for complete search history.

(56) References Cited

U.S. PATENT DOCUMENTS

| | | | |
|---|---|---|---|
| 4,088,671 | A | 5/1978 | Kobylinski |
| 4,493,905 | A | 1/1985 | Beuther et al. |
| 4,822,824 | A | 4/1989 | Iglesia et al. |
| 5,302,622 | A | 4/1994 | Chaumette et al. |
| 7,071,239 | B2 | 7/2006 | Ortego, Jr. et al. |
| 2004/0132834 | A1 | 7/2004 | Ortego et al. |
| 2005/0054738 | A1 | 3/2005 | Fraenkel |
| 2005/0234137 | A1 | 10/2005 | Espinoza et al. |

FOREIGN PATENT DOCUMENTS

| | | |
|---|---|---|
| GB | 2473071 A | 3/2011 |
| WO | 2005/072866 A1 | 8/2005 |
| WO | 2010/147513 A2 | 12/2010 |

OTHER PUBLICATIONS

International Search Report, dated Feb. 14, 2013, from corresponding PCT application.
GB Search Report, dated Feb. 14, 2012, from corresponding GB application.

*Primary Examiner* — Jafar Parsa
(74) *Attorney, Agent, or Firm* — Young & Thompson

(57) ABSTRACT

A method is described for preparing a catalyst precursor suitable for use in the Fischer-Tropsch synthesis of hydrocarbons including 10 to 40% by weight of cobalt oxide crystallites and 0.05 to 0.5% by weight of a precious metal promoter, dispersed over the surface of a porous transition alumina wherein the surface of the transition alumina has been modified by inclusion of 0.25 to 3.5% wt magnesium, including the steps of:
 (a) forming a modified catalyst support by impregnating a transition alumina with a magnesium compound, drying and calcining the impregnated alumina in a first calcination at a temperature ≤600° C. to convert the magnesium compound into oxidic form, and
 (b) forming a catalyst precursor by impregnating the modified catalyst support with a cobalt compound and precious metal promoter compound, drying and calcining the impregnated catalyst support in a second calcination to convert the cobalt compound to cobalt oxide.

17 Claims, 2 Drawing Sheets

FISCHER-TROPSCH CATALYST COMPRISING COBALT, MAGNESIUM AND PRECIOUS METAL

FIELD OF THE INVENTION

This invention relates to cobalt catalysts and in particular precious metal promoted cobalt catalysts supported on a modified transition alumina, suitable for use in the Fischer-Tropsch synthesis of hydrocarbons at high temperature.

BACKGROUND OF THE INVENTION

Precious metal-promoted cobalt Fischer-Tropsch catalysts supported on titania, alumina or silica are known. U.S. Pat. No. 4,088,671 discloses a hydrocarbon synthesis process using Ru-promoted Co catalysts on various supports. U.S. Pat. No. 4,493,905 discloses fluidized bed catalysts suitable for the Fischer-Tropsch reaction prepared by contacting finely divided alumina with an aqueous impregnation solution of a cobalt salt, drying the impregnated support and thereafter contacting the support with a nonaqueous, organic impregnation solution of salts of ruthenium and a Group IIIB or IVB metal. U.S. Pat. No. 4,822,824 discloses Ru-promoted Co catalysts on titania. U.S. Pat. No. 5,302,622 discloses a process for the synthesis of hydrocarbons, using a catalyst comprising cobalt, copper and ruthenium on silica or alumina. The catalysts may be provided as oxidic precursors and reduced to their active form in situ in the Fischer-Tropsch reactor, or a pre-reduced catalyst, with the elemental cobalt either passivated or encapsulated in a wax may be provided to the reactor.

A recurring problem with these catalysts is the rapid deactivation at high temperatures in use, in particular in operation at temperatures ≥230° C.

WO2005/072866 describes a method of producing an alumina-supported catalyst, which comprises the following steps: a first impregnation step in which an initial alumina support material is impregnated with a source of a 2-valent metal capable of forming a spinel compound with alumina; a first calcination step in which the impregnated alumina support material is calcined at a temperature of at least 550° C. to produce a modified alumina support material; a second impregnation step in which the modified alumina support material is impregnated with a source of catalytically active metal; and a second calcination step in which the impregnated modified support material is calcined at a temperature of at least 150° C. The catalytically active metal may be cobalt; the source of 2-valent metal may comprises a source of cobalt, zinc, magnesium, manganese, nickel or iron, and a promoter comprising platinum, iridium, ruthenium or rhenium may be present. However, the focus of this disclosure is in improving attrition resistance and the magnesium-containing materials tested contained 5 or 10% magnesium, and were calcined at temperatures where the magnesium reacts to form magnesium aluminate. All of the magnesium-containing catalysts showed poor relative activity.

Similarly, U.S. Pat. No. 7,071,239 discloses Fischer-Tropsch processes and catalysts using stabilised supports based on boehmite which have been calcined at high temperature. Preferred structural stabilisers can include an element such as cobalt, magnesium, zirconium, boron, aluminium, barium, silicon, lanthanum, oxides thereof or combinations thereof, or can include precipitated oxides such as co-precipitated silica-alumina.

SUMMARY OF THE INVENTION

We have found that with a combination of precious metal promoter and magnesium-modified alumina support in which the magnesium is present at low levels and prepared at lower temperatures, the resulting cobalt Fischer Tropsch catalysts have increased activity and stability in the Fischer Tropsch reaction, particularly at high temperature.

Accordingly the invention provides a method for preparing a catalyst precursor suitable for use in the Fischer-Tropsch synthesis of hydrocarbons comprising 10 to 40% by weight of cobalt oxide crystallites and 0.05 to 0.5% by weight of a precious metal promoter, dispersed over the surface of a porous transition alumina wherein the surface of the transition alumina has been modified by inclusion of 0.25 to 3.5% wt magnesium, comprising the steps of:
(a) forming a modified catalyst support by impregnating a transition alumina with a magnesium compound, drying and calcining the impregnated alumina in a first calcination at a temperature ≤600° C. to convert the magnesium compound into oxidic form, and
(b) forming a catalyst precursor by impregnating the modified catalyst support with a cobalt compound and precious metal promoter compound, drying and calcining the impregnated catalyst support in a second calcination to convert the cobalt compound to cobalt oxide.

The invention further provides a method for preparing a catalyst comprising the step of reducing the catalyst precursor.

The invention includes therefore the catalyst and catalyst precursors obtainable by these methods.

The invention further provides a process for the Fischer-Tropsch synthesis of hydrocarbons comprising the step of contacting a synthesis gas mixture comprising hydrogen and carbon monoxide with the catalyst in a Fischer-Tropsch reactor.

The magnesium content of the catalyst precursor is in the range 0.25 to 3.5% by weight, preferably about 1.0 to 3.0% by weight, most preferably about 1.5 to 2.5% by weight. Higher levels, e.g. about 4% by weight, were found to have a severe deactivating effect on the activity of the resulting catalyst. Due to the relatively low calcination temperature used, at least a portion of the magnesium in the catalyst precursor is present as magnesium oxide (magnesia), MgO. XRD analysis of the Mg-modified alumina showed no magnesium aluminate to be present. As the amount of magnesium used to modify the alumina is relatively low, only the surface of the alumina is modified so that the bulk properties of the alumina remain largely unchanged. The magnesium may be present within the pores of and on the exterior surface of the transition alumina.

The cobalt content of the catalyst precursor may be in the range 10 to 40% by weight, preferably 15 to 30% by weight to keep the number of impregnations down during manufacture. The promoter metal may be selected from one or more of Pt, Pd, Re, Ru, Ir or Au, however, Ru is particularly preferred. Whereas the promoter may be present in an amount in the range 0.05 to 0.5% by weight, the optimal amount of promoter has been found to be in the range 0.05 to 0.25% wt, preferably 0.05 to 0.20% wt, which is considerably lower than in many of the catalysts previously tested. Lower promoter levels clearly have beneficial handling and cost implications.

The amount of cobalt, precious metal promoter and magnesium in the catalyst precursor may be readily determined using known methods, e.g. ICP-Atomic Emission Spectroscopy (ICP-AES) or X-Ray Fluorescence (XRF).

The transition alumina may be of the gamma-alumina group, for example a eta-alumina or chi-alumina. These materials may be formed by calcination of aluminium hydroxides at 400 to 750° C. and generally have a BET surface area in the range 120 to 400 m²/g. Alternatively, the transition alumina may be of the delta-alumina group, which includes the high temperature forms such as delta- and theta-aluminas that may be formed by heating a gamma group alumina to a temperature above about 800° C. The delta-group aluminas generally have a BET surface area in the range 50 to 150 m²/g. In the present invention, the transition alumina preferably comprises gamma alumina and/or a delta alumina with a BET surface area in the range 120-170 m²/g. Where the catalyst precursor is prepared using a gamma alumina, it is possible by the calcination and reduction procedure to convert at least a portion of this to delta alumina. Thus the catalyst precursor may be prepared with a gamma alumina yet the catalyst comprise precious-metal promoted cobalt crystallites dispersed over a gamma alumina, a delta alumina or a mixed phase material comprising delta and gamma aluminas. The alumina should be of suitable purity for use as a catalyst support. In particular the level of alkali metal, notably sodium, in the alumina is desirably <50 ppm, more preferably <10 ppm. It will be understood that the transition aluminas used in the present invention are very different in properties and behaviour to the hydrated aluminas such as alumina trihydrate and boehmite.

A suitable alumina powder for the catalyst support generally has a volume-median diameter D[v,0.5] in the range 1 to 200 µm. In certain applications such as for catalysts intended for use in slurry reactions, it is advantageous to use very fine particles which have a volume-median diameter D[v,0.5], in the range from 1 to 30 µm, e.g. 5 to 25 µm. For other applications e.g. as a catalyst for reactions carried out in a fluidised bed, it may be desirable to use larger particle sizes, preferably in the range 50 to 150 µm. The term volume-median diameter D[v,0.5], sometimes given as $D_{50}$ or $D_{0.5}$, may be calculated from the particle size analysis which may conveniently be effected by laser diffraction for example using a Malvern Mastersizer.

The pore volume of the alumina support is preferably relatively high in order to take the cobalt loadings. The pore volume of the alumina is preferably above 0.30 cm³/g, more preferably in the range 0.35 to 0.85 cm³/g, and may be determined by nitrogen physisorption using known techniques. It is preferred that the alumina support has a relatively large average pore diameter as the use of such supports may give catalysts of particularly good selectivity. Preferred supports have an average pore diameter (APD) of at least 10 nm, particularly in the range 12 to 25 nm. [By the term average pore diameter we mean 4 times the pore volume as measured from the adsorption branch of the nitrogen physisorption isotherm at 0.99 relative pressure divided by the BET surface area].

The transition alumina is desirably in powder form but may also be a shaped pellet or extrudate.

In powder form, e.g. as a spray-dried powder, the resulting catalyst precursor may be used in slurry-phase Fischer-Tropsch reactors. A catalyst precursor powder may also be shaped into pellets or extrudates, or used to prepare a wash-coat suitable for coating metal or ceramic support structures. In shaped form, e.g. pellets, or extrudates, the catalyst precursor may be suitable for use in fixed bed Fischer-Tropsch reactors. In coated form, e.g. as a washcoating on a metal or ceramic support structure, the catalyst may be used in microchannel reactors.

In the activated catalyst, at least a portion of the cobalt oxide ($Co_3O_4$) in the catalyst precursor is reduced to elemental cobalt. The catalyst, when in the reduced state comprise cobalt crystallites that desirably have an average size in the range 6 to 14 nm, preferably 6 to 10 nm. This may be determined by XRD analysis or from the cobalt surface area measurement, which may be suitably determined by hydrogen chemisorption.

Catalysts in the reduced state can be difficult to handle as they can react spontaneously with oxygen in air, which can lead to undesirable self-heating and loss of activity. Consequently the reduced catalyst is preferably protected by encapsulation of the reduced catalyst particles with a suitable barrier coating. In the case of a Fischer-Tropsch catalyst, this may suitably be a hydrocarbon wax. The catalyst may them be provided in the form of a pellet, pastille or flake according to known methods. Alternatively the catalyst may be provided as a slurry in molten wax.

The method for preparing the catalyst support comprises; (a) forming a modified catalyst support by impregnating a transition alumina with a magnesium compound, drying and calcining the impregnated alumina in a first calcination at a temperature ≤600° C. to convert the magnesium compound into oxidic form, and; (b) forming a catalyst precursor by impregnating the modified catalyst support with a cobalt compound and precious metal promoter compound, drying and calcining the impregnated catalyst support in a second calcination to convert the cobalt compound to cobalt oxide.

In impregnation methods, a suitable soluble metal compound, for example the metal nitrate or acetate may be impregnated onto a support material from an aqueous or non-aqueous solution, e.g. ethanol, which may include other materials, and then dried to remove the solvent or solvents. One or more soluble metal compounds may be present in the solution. One or more impregnation steps may be performed to increase metal loading. Impregnation may be performed using any of the methods known to those skilled in the art of catalyst manufacture, but preferably is by way of a so-called 'dry' or 'incipient-wetness' impregnation as this minimises the quantity of solvent used and to be removed in drying. Incipient wetness impregnation comprises mixing the support material with only sufficient solution to fill the pores of the support. In the present invention, amounts up to 150% of incipient wetness volume are preferred.

The magnesium compound may be any suitably soluble magnesium compound but is preferably one that converts to magnesia relatively easily upon heating and which does not leave residues that might cause poisoning or undesirable side reactions in the Fischer-Tropsch process. A particularly preferred magnesium compound is magnesium nitrate, which is desirably applied as an aqueous solution to the transition alumina. A single impregnation is generally sufficient to provide the desired magnesium content in the calcined catalyst precursor.

The impregnated alumina is dried under air or an inert gas such as nitrogen if desired. Drying, to remove solvent, may be done at ambient temperature from about 20° C., but is preferably performed at temperatures in the range 90-120° C. for 1-8 hours. Vaccuum drying may also be used. Alternatively the drying step may be done as the initial part of the calcination process applied to the impregnated alumina.

The first calcination should be done ≤600° C., and preferably ≤550° C. or even ≤540° C., so that the magnesia formed upon decomposition of the magnesium compound is not converted to the magnesium aluminate spinel. Although calcination may be performed under an inert gas such as nitrogen, it is preferably performed under air. The first calcination is desirably performed at a temperature ≥250° C., preferably ≥350° C., most preferably ≥450° C. so that the conversion of the magnesium compound to magnesia is essentially completed and is not overly-lengthy. Typically the first calcination may be performed by increasing the temperature over a period of 1-6 hours to a maximum temperature and holding there for a period up to about 6 hours.

The magnesium-modified alumina may then be treated with the cobalt and precious metal compounds. Impregnation methods for producing cobalt catalysts generally comprise combining a catalyst support with a solution of cobalt acetate and/or cobalt nitrate, e.g. cobalt (II) nitrate hexahydrate at a suitable concentration. Whereas a number of solvents may be used such as water, alcohols, ketones or mixtures of these, preferably the modified support is impregnated using an aqueous solution of cobalt nitrate. With cobalt nitrate hexahydrate, it is possible to "self-solubilise" by warming the material to about 60° C. at which point the cobalt nitrate dissolves in its water of crystallisation. Preferably the impregnation and drying are repeated until the cobalt content of the calcined catalyst precursor is in the range 15-30% by weight.

The precious metal promoter is also included in the catalyst precursor by impregnation, using suitable soluble compounds such as the nitrate, which includes nitrosyl-nitrate, chloride, acetate, or mixtures of these. Preferably the precious metal promoter compound is a compound of Pt, Pd, Re, Ru, Ir or Au, and the impregnation is repeated until the precious metal content of the dried catalyst precursor is in the range in the range 0.05 to 0.5% by weight, preferably 0.05 to 0.2% by weight. In a preferred embodiment, the precious metal compound is a Ru compound. Ruthenium acetate, preferably ruthenium nitrosyl nitrate may be used.

The cobalt compound and precious metal compound may be impregnated simultaneously or sequentially. Hence, the promoter may be included in the catalyst precursor before or after the cobalt, or at the same time by combining the cobalt and promoter compounds in the same impregnating solution. Simultaneous co-impregnation of cobalt and precious metal promoter has been found to work particularly well in the present invention.

The drying step may be performed, as for the magnesium-modified support, at 20-120° C. in air or under an inert gas such as nitrogen, or in a vacuum oven. Again, the catalyst precursor may be dried to remove solvent prior to the second calcination, or the second calcination used to both dry and convert the cobalt compounds to the oxidic form. Prior to the second calcination, the catalyst precursor may be pre-calcined at lower temperature, particularly after a first cobalt impregnation in advance of a second or further cobalt impregnation. Such pre-calcination is preferably performed by raising the temperature following the drying step to temperatures in the range 200-300° C. over periods of between 1 and 6 hours. The second calcination may be performed in air or inert gas, at a temperature in the range 250 to 650° C., preferably 450 to 650° C., more preferably 450-550° C. The calcination time is preferably 24 hours, more preferably ≤16 hours, most preferably ≤8 hours, especially ≤6 hours. Typically the second calcination may be performed by increasing the temperature over a period of 1-6 hours to a maximum temperature and holding there for a period up to about 6 hours.

To render the catalyst precursor catalytically active for Fischer-Tropsch reaction, at least a portion of the cobalt oxide may be reduced to cobalt metal. The reducing step may be performed with a reducing gas selected from hydrogen, synthesis gas or a mixture of hydrogen and/or carbon monoxide with nitrogen or other inert gas. Preferred reducing gas streams that may be used include hydrogen- and/or carbon monoxide-containing gases. Reduction is preferably performed using hydrogen-containing gases at elevated temperature. Preferably the reducing gas stream comprises hydrogen at >25% vol, more preferably >50% vol, most preferably >75% vol, especially >90% vol hydrogen. The temperature of the reducing gas stream, and hence the catalyst precursor, during the reduction stage is preferably in the range 350 to 500° C. The reduction time is preferably ≤24 hours, more preferably ≤16 hours, most preferably ≤8 hours, especially ≤6 hours, with a minimum reduction time of about 2 hours.

Preferably at least 60% of the cobalt is reduced, i.e. the degree of reduction (DOR) is preferably ≥60%, more preferably ≥75%, especially ≥80%. A temperature-programmed reduction (TPR) method for estimating DOR may be used as follows:

1. Steadily increase the sample temperature to the desired reduction temperature at 10° C./min, hold at that temperature for seven hours (TPR1).

2. Without cooling back to room temperature, increase the sample temperature to 1000° C. at 10° C./min and hold at 1000° C. for ten minutes. (TPR2). This gives complete reduction of all cobalt.

3. Integrate the hydrogen uptakes from TPRs 1 and 2. The ratio TPR1/(TPR1+TPR2) is the degree of reduction (expressed as %).

The reduction may be performed at ambient pressure or increased pressure, i.e. the pressure of the reducing gas may suitably be from 1-50 bar abs, preferably 1-20 bar abs, more preferably 1-10 bar abs.

The gas-hourly-space velocity (GHSV) for the reducing gas stream may be in the range 100-25000 $hr^{-1}$, preferably 1000-15000 $hr^{-1}$.

Before the reduction step, the dried or calcined catalyst precursor may, if desired, be formed into shaped units suitable for the process for which the catalyst is intended, using methods known to those skilled in the art. The shaped units may be agglomerates, pellets or extrudates, which may be spheres, cylinders, rings, or multi-holed pellets, which may be multi-lobed or fluted, e.g. of cloverleaf cross-section.

Following reduction, due to the reactivity of the cobalt metal to oxygen in air, the process for preparing the catalyst preferably further comprises a step of encapsulating the reduced catalyst in a hydrocarbon wax.

The catalysts may be used for the Fischer-Tropsch synthesis of hydrocarbons. The Fischer-Tropsch synthesis of hydrocarbons with cobalt catalysts is well established. The Fischer-Tropsch synthesis converts a synthesis gas mixture comprising carbon monoxide and hydrogen to hydrocarbons. The synthesis gas typically has a hydrogen: carbon monoxide ratio in the range 1.6 to 3.0:1, preferably 1.8 to 2.2:1. The reaction may be performed in a continuous or batch process using one or more fixed bed reactors, micro-channel reactors (i.e. reactors in which the catalyst is disposed in channels typically with a cross-sectional area <150 $mm^2$), conventional stirred slurry-phase reactors, jet-loop reactors, bubble-column reactors, or fluidised bed reactors. The process may be operated at pressures in the range 10 to 60 bar abs and temperatures in the range 150-260° C. The gas-hourly-space velocity (GHSV) for continuous operation may be in the range 100-25000 $hr^{-1}$. A preferred operating range is 1000-20000 $hr^{-1}$.

The catalysts of the present invention have shown enhanced stability at high operating temperatures, especially temperatures in the range 200-260° C., particularly temperatures in the range 230-260° C. For temperatures in the range 230-250° the process may be operated at a CO conversion above 40%, with a C5+ hydrocarbon selectivity ≥80% and a methane selectivity ≤15% preferably ≤10%. This selectivity stability, i.e. a C5+ hydrocarbon selectivity stability and methane selectivity stability, has been demonstrated for 24 hours or longer. Corresponding catalysts without the magnesia promotion, or with higher levels of magnesium do not show the same selectivity stability. Conversion stabilities, defined as the initial CO conversion (before operating ≥210° C.) divided by the final CO conversion (after operating ≥210° C., particularly 230° C.-260° C.) under the same flowrate, temperature and pressure conditions, above 0.8 and even above 0.9 may be achieved.

BRIEF DESCRIPTION OF THE FIGURES

The invention will now be further described by reference to the following Examples and by reference to FIGS. 1, 2 and 3, wherein.

DETAILED DESCRIPTION OF THE INVENTION

EXAMPLE 1

Figure 1:
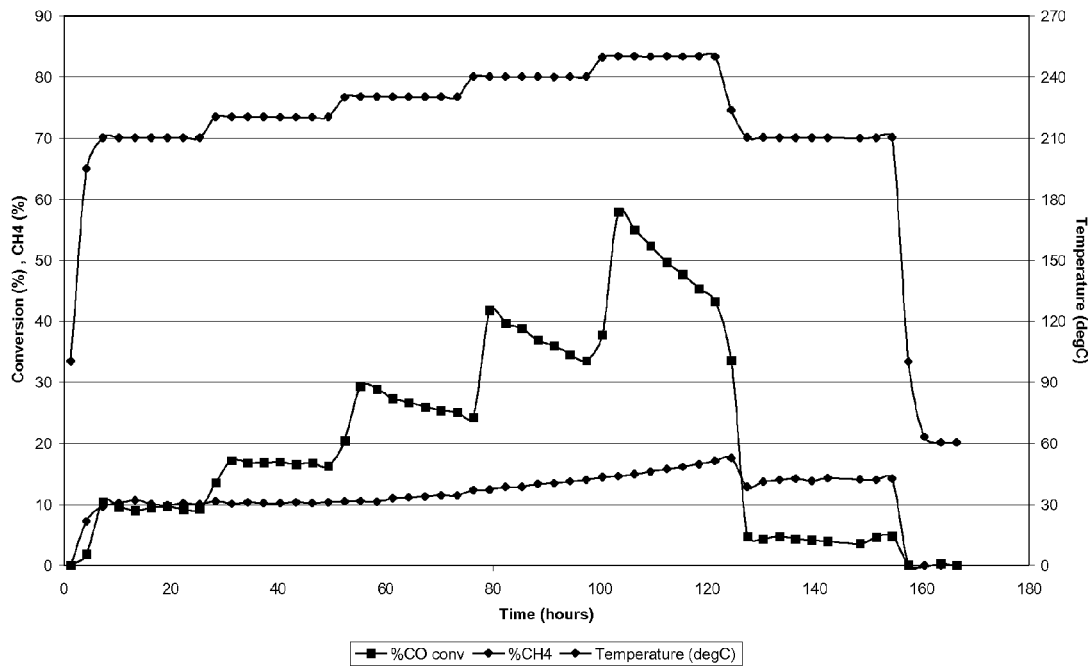
FIG. 1 depicts the comparative catalyst C performance vs. time.

Preparation of Catalyst Precursors a) Support. A commercially available transition alumina powder (Puralox 100/150) was impregnated using an incipient wetness method with an aqueous solution of magnesium nitrate hexahydrate (MgNHH). The damp material was then spread onto a stainless steel tray, and calcined in air at 550° C. for 5 hours with a 5° C./min ramp rate. Three modified supports were made, nominally with 0.5% wt Mg, 3% wt Mg and, for comparison, 6% wt Mg.

The amounts used were:

Example 1a: 0.5% Mg-39.6 g Puralox 100/150, 2.7 g MgNHH, 42.5 mL deionised water.

Example 1b: 3% Mg-38.5 g Puralox 100/150, 15.9 g MgNHH 32.5 mL of deionised water.

Comparative A: 6% Mg-36.9 g Puralox 100/150, 31.6 g MgNHH, 20.8 mL deionised water.

b) Catalyst Precursors. All three modified supports were co-impregnated with aqueous solutions of cobalt nitrate hexahydrate (CoNHH) and ruthenium nitrosyl nitrate (RuNN) by incipient wetness to produce catalyst precursors nominally with 20% wt Co and 0.1% wt Ru. The amounts used were 49.50 g of CoNHH, 0.16 g of RuNN and an appropriate amount of deionised water (14.0 mL, 6.0 mL, and 2.5 mL respectively for the 0.5% wt Mg, 3% wt Mg and 6% wt MG materials). The damp materials were spread on a stainless steel tray and calcined at 250° C. for 8 hours with a 5° C./min ramp rate. In addition, a comparison material, Comparative B, containing nominally 20% Co and 0.1% Ru on the Puralox 100/150 was produced by an identical method.

Elemental Analysis by XRF on the three Mg-containing materials was as follows;

| Sample | Co | Al | Mg | Ru |
|---|---|---|---|---|
| Example 1a | 17.18 | 36.86 | 0.26 | 0.06 |
| Example 1b | 19.58 | 33.28 | 2.06 | 0.06 |
| Comparative A | 18.26 | 31.07 | 4.13 | 0.05 |

Cobalt surface areas were determined using hydrogen chemisorption as described above.

| Sample name | Co Surface Area ($m^2g^{-1}$ catalyst precursor) |
|---|---|
| Example 1a | 13.0 |
| Example 1b | 14.7 |
| Comparative A | 12.9 |
| Comparative B | 11.2 |

Temperature-programmed reduction (TPR) performed on the catalyst precursors showed two main peaks in all the graphs, which correspond to $Co_3O_4$— to CoO and CoO— to Co metal transitions. The maximum of both peaks shifts to higher temperature with increasing Mg content, and there is the appearance of a low temperature shoulder on the $Co_3O_4$— CoO peak. There is also an increase in the areas under the peaks with increasing Mg loading, especially up to 3% Mg loading, indicating that the Mg modified materials have a larger amount of reducible cobalt, although for the higher Mg loadings this cobalt is only reduced at temperatures above 500° C.

| | $1^{st}$ peak | | $2^{nd}$ peak | |
|---|---|---|---|---|
| Sample | Area (a.u.) | Maximum (° C.) | Area (a.u.) | Maximum (° C.) |
| Example 1a | 0.021 | 241 | 0.048 | 449 |
| Example 1b | 0.028 | 257 | 0.061 | 468 |
| Comparative A | 0.033 | 267 | 0.060 | 498 |
| Comparative B | 0.015 | 240 | 0.034 | 405 |

EXAMPLE 2

Catalyst Testing a) Varied GHSV. Catalysts were tested by placing about 0.134 g of each precursor within a cell of a micro-reactor test unit. The catalysts were reduced at 425° C. in a $H_2$ and Ar flow, and then the temperature was reduced to 160° C. At this point CO was introduced to form a syngas mixture with a $H_2$:CO ratio of 2:1, the pressure was set at 20 bar, and then the temperature was raised gradually using a ramp of 0.1° C./min to 210° C. The catalytic test was started using a flow rate of 30 $ml_N$/min syngas through each cell. The temperatures were increased from 210° C. to 230° C. and 240° C. and the syngas flowrate adjusted at 230° C. and 240° C. to obtain a conversion above 40% at 230° C. The summaries of the experimental results obtained are presented in the following tables. The values of conversion, Selectivity to $CH_4$ and Selectivity to $C_5$+ presented in these tables are obtained by averaging the experimental values over the stated interval. A conversion stability was calculated by dividing the final conversion by the initial conversion under the same conditions.

EXAMPLE 1a

| Temp/° C. | Flow rate/ ml/min | Conv/% | S $CH_4$/% | S $C_{5+}$/% | Pressure/bar | Interval/h | GHSV/(ml/($g_{cat}$ * h) |
|---|---|---|---|---|---|---|---|
| 210 | 30 | 17.4 | 8.35 | 79.94 | 20 | 103-120 | 13373 |
| 230 | 30 | 70.6 | 3.95 | 90.86 | 20 | 129-144 | 13373 |
| 230 | 50 | 40.88 | 7.07 | 84.85 | 20 | 147-167 | 22288 |
| 240 | 60 | 62.88 | 6.88 | 86.4 | 20 | 196-219 | 26746 |
| 210 | 30 | 14.59 | 9.04 | 78.59 | 20 | 237-271 | 13373 |

Conversion stability=0.84

EXAMPLE 1b

| Temp/° C. | Flow rate/ ml/min | Conv/% | S $CH_4$/% | S $C_{5+}$/% | Pressure/bar | Interval/h | GHSV/(ml/($g_{cat}$ * h) |
|---|---|---|---|---|---|---|---|
| 210 | 30 | 11.94 | 9.21 | 70.44 | 20 | 80-118 | 13383 |
| 230 | 30 | 60.16 | 4.21 | 87.75 | 20 | 132-140 | 13383 |
| 230 | 45 | 41.93 | 6.16 | 83.95 | 20 | 151-166 | 20074 |
| 240 | 60 | 63.84 | 6.92 | 85.84 | 20 | 188-215 | 26766 |
| 210 | 30 | 11.79 | 8.16 | 74.64 | 20 | 241-271 | 13383 |

Conversion stability=0.99

Comparative A

| Temp/° C. | Flow rate/ ml/min | Conv/% | S $CH_4$/% | S $C_{5+}$/% | Pressure/bar | Interval/h | GHSV/(ml/($g_{cat}$ * h) |
|---|---|---|---|---|---|---|---|
| 210 | 30 | 0 | N/A | N/A | 20 | 110-121 | 13483 |
| 230 | 30 | 10.67 | 15.78 | 43.9 | 20 | 151-166 | 13483 |
| 240 | 60 | 25.13 | 8.72 | 74.47 | 20 | 200-218 | 26966 |
| 210 | 30 | 0 | N/A | N/A | 20 | 237-271 | 13483 |

Conversion stability=0

Comparative B

| Temp/° C. | Flow rate/ ml/min | Conv/% | S $CH_4$/% | S $C_{5+}$/% | Pressure/bar | Interval/h | GHSV/(ml/($g_{cat}$ * h) |
|---|---|---|---|---|---|---|---|
| 210 | 30 | 26.27 | 8.81 | 81.33 | 20 | 99-118 | 13363 |
| 230 | 30 | 79.77 | 4.2 | 90.69 | 20 | 125-136 | 13363 |
| 230 | 60 | 40.56 | 7.71 | 84.26 | 20 | 155-167 | 26726 |
| 240 | 60 | 71.55 | 7.39 | 84.23 | 20 | 192-215 | 26726 |
| 210 | 30 | 18.26 | 7.95 | 83.24 | 20 | 237-271 | 13363 |

Conversion stability=0.68

Figure 2:
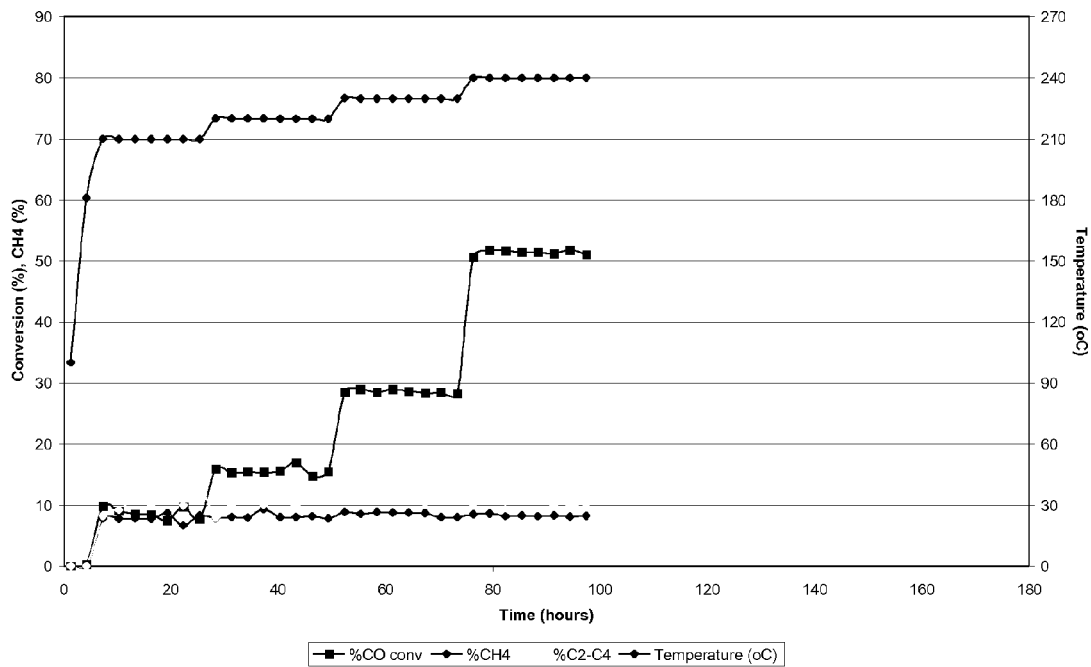
FIGS. 2 and 3 depict Example 1b performance vs. time.
Figure 3:
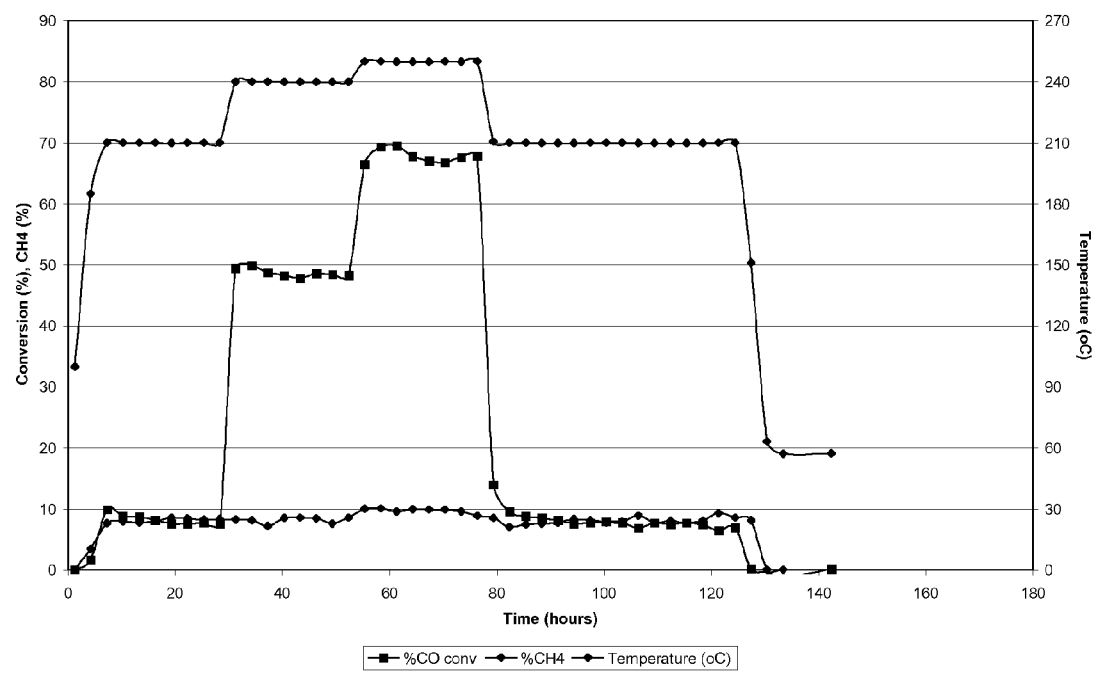

The main findings for these experiments are summarized as follows:

In comparison with Comparative Example B, the addition of Mg to the Co—Ru catalyst reduces the activity of the catalyst, especially at 210° C. The higher the amount of Mg added, the lower the activity of the catalyst and Comparative A, with 4.12% Mg was ineffective at 210° C. However, the addition of Mg in Examples 1a and 1b leads to an increase in the stability of the catalyst. Returning to the start-up conditions (210° C. and 30 ml/minute feed) show that the catalyst doped with 0.5% Mg lost approximately 3% of its initial activity, while the catalyst doped with 3% Mg lost only 0.2% of its initial activity. Although the un-modified catalyst is more active than the catalysts doped with Mg, after being subjected to testing conditions at 230° C. and 240° C. it loses 7% of its initial activity and has a conversion stability of 0.68 compared to Examples 1a and 1b which have values of 0.84 and 0.99 respectively.

b) Fixed GHSV. Further tests were performed in a microreactor using 0.1 g catalyst, but under a fixed GHSV of 16800 l/$kg_{catalyst}$ hour. Example 1b and a further comparative catalyst were tested. Comparative C, like comparative B, contained nominally 20% Co and 0.1% Ru, on a transition alumina and was again prepared by impregnation. However, the ruthenium compound used to prepare the catalyst was ruthenium acetate and the commercial transition alumina used was HP14/150. Reduction of both catalysts was carried out at 380° C. using pure hydrogen over 7 hrs. Testing was performed at a H2/CO ratio of 2:1 at 20 bar and a GHSV of 16800 l kgcat$^{-1}$·hr$^{-1}$. The results are given in the following table and are depicted in FIGS. 1, 2 and 3.

| Sample Code | Temp/ ° C. | % CO Conv | Selectivity/% | | | |
|---|---|---|---|---|---|---|
| | | | $CH_4$ | $CO_2$ | $C_{2-4}$ | $C_{5+}$ |
| Comparative C | 210 | 9.1 | 9.7 | 0.0 | 8.5 | 81.9 |
| Example 1b | 210 | 9.7 | 7.8 | 0.1 | 10.0 | 82.1 |
| Comparative C | 220 | 16.2 | 10.6 | 0.0 | 9.2 | 80.2 |
| Example 1b | 220 | 17.0 | 8.1 | 0.1 | 9.9 | 81.9 |
| Comparative C | 230 | 25.1 | 11.9 | 0.3 | 9.8 | 78.0 |
| Example 1b | 230 | 28.4 | 8.7 | 0.2 | 10.4 | 80.7 |
| Comparative C | 240 | 33.5 | 14.7 | 0.5 | 11.3 | 73.5 |
| Example 1b | 240 | 51.8 | 8.1 | 0.4 | 10.0 | 81.5 |

-continued

| Sample Code | Temp/ °C. | % CO Conv | Selectivity/% | | | |
|---|---|---|---|---|---|---|
| | | | CH$_4$ | CO$_2$ | C$_{2-4}$ | C$_{5+}$ |
| Comparative C | 250 | 43.3 | 18.2 | 1.0 | 12.4 | 68.4 |
| Example 1b | 250 | 67.6 | 9.4 | 0.9 | 9.3 | 81.4 |

FIG. 1 depicts comparative catalyst C performance vs time. The results indicate that the Comparative catalyst C offered conversion above 40% only at 250° C. where it rapidly deactivates. Deactivation is also seen in FIG. 1 at 240° C. and 230° C. The initial CH$_4$ level of 10 increased as the temperature was increased, showing a falloff in selectivity, and remained at about 15% when the initial operating conditions (210° C.) were re-established. Furthermore the CO conversion had dropped from about 9% initially to about 4% after the operation at 250° C. i.e. a conversion stability in this case of about 0.44.

FIGS. 2 and 3 depict Example 1b performance vs time. In FIG. 2, Example 1b demonstrated conversion above 40% at 240° C. and CO conversions at 230° C. and 240° C. were stable. FIG. 2 also shows that Methane levels below 10% were maintained throughout the test. The test was stopped at 100 hours. A repeat test was performed and is depicted in FIG. 3. In this case, the process was heated directly from 210° C. to 240° C. and then 250° C. before re-establishing operation at 210° C. The CO conversion at 240° C. of about 50% was again observed, with operation at 250° C. giving CO conversion at 65-70%. The CO conversion upon re-establishing the initial operating condition remained at about 9% and the methane selectivity did not increase above 10%. Thus this test shows that the magnesium-doped catalyst maintains its initial performance.

The invention claimed is:

1. A method for preparing a catalyst precursor suitable for use in the Fischer-Tropsch synthesis of hydrocarbons comprising 10 to 40% by weight of cobalt oxide crystallites and 0.05 to 0.5% by weight of a precious metal promoter, dispersed over the surface of a modified catalyst support formed from a porous transition alumina the surface of which has been modified by inclusion of 0.25 to 3.5% wt magnesium, comprising the steps of:
   (a) forming a modified catalyst support by impregnating a transition alumina with a magnesium compound, drying and calcining the impregnated alumina in a first calcination at a temperature ≤600° C. to convert the magnesium compound into oxidic form, and
   (b) forming a catalyst precursor by impregnating the modified catalyst support with a cobalt compound and precious metal promoter compound, drying and calcining the impregnated catalyst support in a second calcination to convert the cobalt compound to cobalt oxide.

2. The method according to claim 1 wherein the transition alumina comprises gamma alumina and/or a delta alumina.

3. The method according to claim 1 wherein the transition alumina is a powder or a shaped pellet or extrudate.

4. The method according to claim 1 wherein the magnesium compound is magnesium nitrate.

5. The method according to claim 1 wherein the cobalt compound is cobalt nitrate, cobalt acetate or a mixture thereof.

6. The method according to claim 1 wherein the precious metal promoter compound is selected from a compound of Pt, Pd, Re, Ru, Ir or Au.

7. The method according to claim 1 wherein the precious metal compound is a precious metal acetate or nitrate.

8. The method according to claim 1 wherein the cobalt compound and precious metal compound are impregnated simultaneously.

9. The method according to claim 1 wherein the cobalt compound and precious metal compound are impregnated sequentially.

10. The method according to claim 1 wherein the first calcination is performed at a temperature ≤550° C.

11. The method according to claim 1 wherein the first calcination is performed at a temperature ≥250° C.

12. A method for preparing a catalyst comprising the step of reducing the catalyst precursor prepared according to claim 1.

13. The method according to claim 12 wherein the reducing step is performed with a reducing gas mixture comprising hydrogen, synthesis gas or a mixture of hydrogen and/or carbon monoxide with nitrogen or other inert gas.

14. The method according to claim 13 wherein the reducing gas mixture comprises >90% vol hydrogen.

15. The method according to claim 13 wherein the reduction is performed at a temperature in the range 350 to 500° C.

16. The method according to claim 12 further comprising a step of encapsulating the reduced catalyst in a hydrocarbon wax.

17. The method according to claim 1, wherein the precious metal promotor is a compound of Ru.

* * * * *